Jan. 27, 1959　　　F. J. TOBIN　　　2,871,152

LAMINATED TILE

Filed Dec. 6, 1955

INVENTOR.
FRANK J. TOBIN

BY
RICHEY, WATTS, EDGERTON & McNENNY

ATTORNEYS

United States Patent Office 2,871,152
Patented Jan. 27, 1959

2,871,152

LAMINATED TILE

Frank J. Tobin, Cleveland, Ohio

Application December 6, 1955, Serial No. 551,295

1 Claim. (Cl. 154—43)

The present invention relates generally to the molding art and is more particularly concerned with novel molded composite articles uniquely combining physical and decorative characteristics and with a new molding method whereby these articles can economically and advantageously be made in a wide variety of sizes and forms.

There has for many years been an urgent demand for articles having three dimensional decorative effects or appearances. Typical of this demand is the situation in the building industry with respect to the use of polished marble. Due to the excessive and constantly increasing cost of quarrying, polishing, shipping, handling and using marble in building construction, a number of efforts have been made heretofore by others in various fields to provide a building material simulating marble in appearance and most physical characteristics, but offering the advantage of greatly reduced cost. Thus, a variety of painted and enameled articles and various synthetic plastic bodies have been invented, discovered and developed and used to some extent in place of marble and similar natural stone materials. Nevertheless, there never has been available or known prior to the present invention, a synthetic article of truly marble-like appearance.

In accordance with this invention and my discoveries, upon which it is based to be described below, an article of truly marble-like appearance is provided in full and complete satisfaction of the aforesaid long standing problem. The article of this invention is easy and economical to make on any manufacturing scale and this article may take, as indicated above, any desired form or shape or may be made in widely different sizes for the different uses for which it is desired. Furthermore, this article offers physical characteristics of strength and erosion resistance making it suitable for use in place of natural marble and similar more expensive building materials and also the additional advantage of special corrosion resistance for special uses where marble and the like cannot be employed for lack of resistance to certain corrosive substances.

Another significant advantage of the present invention is that entirely new decorative effects can be obtained. Three dimensional decorative effects or the appearance of depth can be obtained to a striking degree in these invention articles so that what might be considered a new family of marble types is provided. Thus, there is more clarity and depth and fluidity of appearance of a panel or wall made of the articles of this invention than one of natural polished stone. Also, the ranges of colors and tones and the complexity of the designs and contrast of texture and appearances possible in accordance with this invention are far beyond those features of the natural material.

Still another important advantage of this invention is that while it does not require any new or expensive material in the manufacture of the present novel articles, the invention holds forth the possibility for those skilled in the art of the development of new materials and new combinations of materials to achieve new and better decorating results or physical characteristics and decorating effects in combination.

In the course of making this invention, I discovered that glass fibers in matted form could be incorporated as a laminated structure in a plastic body to provide an article having superior physical strength by comparison with similar plastic bodies of the prior art. I discovered also that a plurality of layers of glass fiber mats can be incorporated in a clear plastic body to produce an article which is at least partially transparent. Still further, I discovered that chromatic materials of conventional forms can be incorporated in these molded, composite, laminated, plastic bodies at varying depths and in clearly visible form by disposing them between and below layers of the laminated assembly. As an additional discovery, I have found that it is preferable to make the articles of this invention by forcing plastic material in liquid form through laminated glass fiber mats so that an integral plastic body is formed and the chromatic materials and the glass fibers in mats are embedded in the finished solid plastic matrix.

Those skilled in the art will gain a better and further understanding of this invention and its objects and advantages over the art upon consideration of the detailed description set forth below, having reference to the drawings accompanying and forming a part of this specification, in which.

In general, the molded composite article of this invention comprises a clear plastic body having substantially smooth and continuous top, bottom and side surfaces, an internal network structure constituting in effect, a matrix, and chromatic material embedded in the network or matrix in random distribution in varying depths below the top surface of the article to provide a three-dimensional appearance. Preferably, the article also includes a fibrous mat or a plurality of fibrous mats arranged in laminated relation and encased in the plastic body to locate and maintain in position within limits the chromatic material during molding and to impart special physical characteristics as mentioned above to the finished article.

The method of this invention, broadly described, comprises the steps of applying chromatic material to a fibrous mat or plurality of fibrous mats and then embedding the mat or mats in the form of a laminated body in a clear solid plastic substance. In accordance with the preferred practice of this method, the mat or mats carrying chromatic material are placed in a cavity in an ejection mold in the form of a laminated body. Liquid plastic material is then forced into the mold cavity and flowed into and through the mat or the laminated body to wet the fibers and chromatic material and to fill the cavity. As a final step, the plastic material is solidified to form the finished article.

Figure 1:
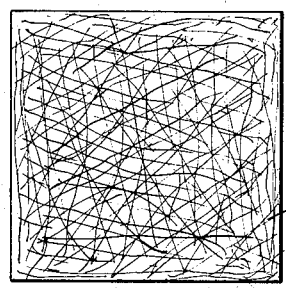
Figure 1 is a plan view of a fiber glass mat of the type preferred for use in the method of this invention.

With reference to Figures 1 to 5, inclusive, the method of this invention is carried out along the general lines set forth above, a plurality of fiber glass mats, like mat 10 of Figure 1, being used. Mat 10 is commercially available on the market and is, accordingly, well known to those skilled in the art as a thin sheet-like body of glass fibers of random orientation. The mat should not be of such thickness as to substantially be opaque but, on the other hand, it is not essential that it be practically transparent or extremely thin in any portion. For the purposes of this invention, it is preferable that relatively thin mats constitute the upper layers of the laminated structure while the heavier or more dense mats are located underneath.

Figure 2:
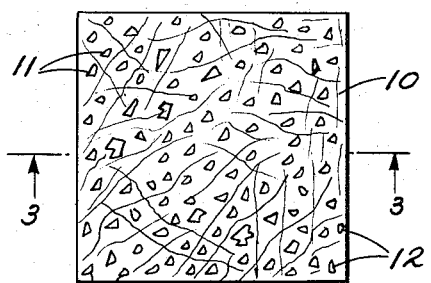
Figure 2 is a view similar to Figure 1 showing particles of chromatic material dispersed on the mat as a step of the preferred method hereof.
Figure 3:
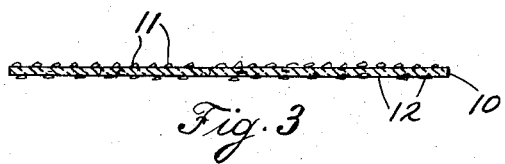
Figure 3 is a transverse, sectional view taken on line 3—3 of Figure 2.
Figure 4:
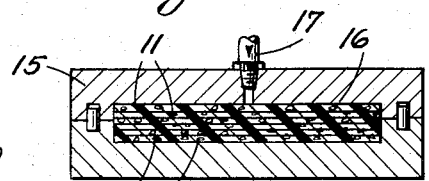
Figure 4 is a cross-sectional view of a laminated body of a plurality of mats bearing a chromatic material as shown in Figure 2 disposed in an injection mold in preparation for the molding step of this method.

As shown in Figures 2 and 3, particles 11 and 12 of chromatic material are distributed on the upper and lower surfaces, respectively, of mat 10 and as shown in Figure 4, a plurality of these mats carrying chromatic particles are disposed in the cavity of an injection mold 15 as a laminated body 16. A clear plastic substance is injected into the cavity of mold 15 through pipe 17 and the plastic substance in liquid form thus is forced through the laminated body so that the latter is wet by and entirely enclosed within the plastic substance and the chromatic particles 11 and 12 are embedded in a matrix of plastic material.

Figure 5:
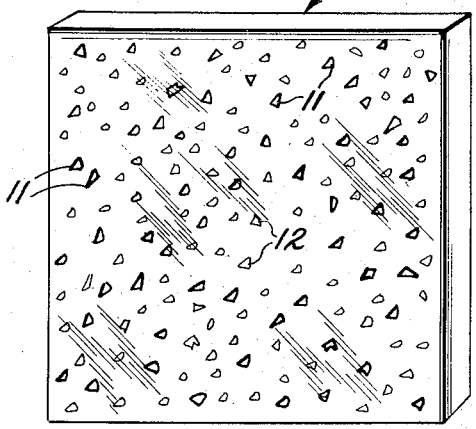
Figure 5 is a perspective view of an article of this invention as obtained from the molding operation illustrated in Figure 4.

The molded composite article 20 illustrated in Figure 5 is produced by the process of this invention as outlined above, mold 15 being opened with the plastic material in the mold cavity solidified in accordance with the curing characteristics of the synthetic resin employed. Article 20 displays no evidence of a laminated structure but rather has the appearance of an integral body in which chromatic particles 11 and 12 are clearly visible at varying depths beneath the article surface.

Figure 6:
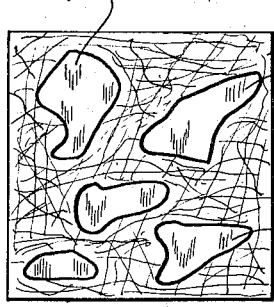
Figure 6 is a view similar to Figure 2 showing a liquid chromatic material disposed in patterns on the fiber glass mat of the type illustrated in Figure 1.
Figure 7:
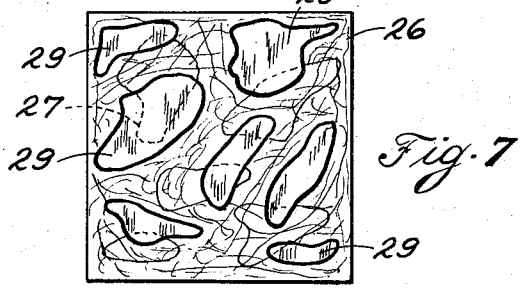
Figure 7 is a view of a laminated body made up of the mat of Figure 6 and a second mat thereon bearing liquid chromatic material disposed in overlapping designs as a stage of the production of a body of this invention of marble-like appearance.

Referring to Figures 6 and 7, a glass fiber mat 25, similar to mat 10 and another similar mat 26 are employed to produce in accordance with this invention, another of the novel articles hereof. In this instance, chromatic material in the form of a dye is applied in patterns 27 to the upper surface of mat 25 and a dye of another color or shade is applied in different, but overlapping patterns 29 to mat 26. Mats 25 and 26 are then assembled as layers of a laminated structure, mat 26 resting on top of mat 25 so that the article ultimately produced will have a truely marble-like appearance. Here again, the method employed will involve the use of mold 15 and the injection of suitable plastic material in liquid form into the mold and into the laminated body.

Those skilled in the art will understand that the objects and advantages and the new results of this invention are to be obtained through the use of a substantial variety of synthetic resinous materials or plastic substances and that there are a number and variety of chromatic materials, both solid and liquid and of mixed solid-liquid types which may be employed to produce the novel articles hereof. An important consideration is the compatability of the various substances used to make these articles because of the intimate contact of all of the constituents of these molded bodies.

I have found that the polyester resins of the type described in United States Patent No. 2,593,787 suitable for use in this invention. Preferably, a hardening agent and a catalyst are employed in accordance with the usual practices in the use of resins of this type. The hardening agent may be a metallic oxide such as cobalt oxide while the catalyst may be of the peroxide type such as a 60% solution of methyl ethyl ketone peroxide in dimethyl phthalate. A satisfactory composition of this type contains 100 parts of resin, 2 parts of hardening agent and 2 parts of catalyst. Where a resin mixture of this type is used, hardening setting or solidification is preferably expedited by heating the mold for ten minutes in an oven at a temperature up to about 225° F. However, it is contemplated that room temperature conditions may be employed to effect the solidification of the articles of this invention in the mold and in no case should these articles be subjected to temperatures in excess of 225° F.

Depending upon the inner surfaces of the mold defining the mold cavity, the articles of this invention will have smooth or rough, rippled or stippled surfaces but where marble-like appearances are important in the finished article, it will be preferable to provide smooth mold cavity surfaces. Where it is desired to provide an article which has a background color effect, a coating of paint or dye of that color is suitably applied to the entire back portion of the article. If the article is relatively thin, such as a tile-like body and the fiber glass mats employed in producing the intermediate laminated structure are not so dense as to render the article opaque, there will result a diffusion of the desired color throughout the article. Likewise, where fluorescent or phosphorescent effects are desired in these bodies, either may be obtained through such a back coating technique or alternatively, the chromatic material applied to the production of intermediate laminated structure may be of fluorescent or phosphorescent nature.

Solid chromatic materials which are generally desired for use in accordance with this invention include those affording bright or sparkling appearance such as particles of aluminum or anodized aluminum or clean bright copper, brass or bronze or even more costly metals where the articles to be produced are small enough so that the cost is not excessive. The dyes employed may be any of those used in accordance with prior art practice with the particular resin involved. Similarly, paints are selected according to their compatability with the resin and their tolerance for the condition of the curing or setting of the resin in the molding operation.

While tile-like or block-like bodies are illustrated and described specifically herein, it will be understood that bodies of other suitable shapes can be made by providing appropriate molds and without departing in any way from the spirit of this invention or the teachings herein or the scope of the appended claims.

Having thus described the present invention so that those skilled in the art may be able to gain a better understanding and practice the same, I state that what I desire to secure by Letters Patent is defined in what is claimed.

What is claimed is:

A partially-transparent, molded, composite article having an outer face of sparkling, three-dimensional appearance which comprises a plurality of fiber glass mats arranged in laminated relation, a solid integral body of clear plastic material encasing and dispersed throughout the laminated mat structure, and particles having light-reflective, plane surface portions distributed at random depth and at random angles to each other substantially throughout the depth of the article and disposed in the fiber glass mats and in spaces between the said mats whereby the light-reflecting effects of these particles vary from dull to brilliant with variations in viewing angle and with variations in depth of the particles below the surface of the article exposed to view.

References Cited in the file of this patent

UNITED STATES PATENTS

| | | |
|---|---|---|
| 1,905,999 | Ellis | Apr. 25, 1933 |
| 1,989,704 | Leguillon | Feb. 5, 1935 |

(Other references on following page)

UNITED STATES PATENTS

| | | |
|---|---|---|
| 2,054,454 | Thies et al. | Sept. 15, 1936 |
| 2,176,837 | Ellis | Oct. 17, 1939 |
| 2,350,421 | Schoder et al. | June 6, 1944 |
| 2,353,995 | Conner | July 18, 1944 |
| 2,495,640 | Muskat | Jan. 24, 1950 |
| 2,554,363 | Glaser et al. | May 22, 1951 |
| 2,556,798 | Concordet | June 12, 1951 |
| 2,577,205 | Meyer et al. | Dec. 4, 1951 |
| 2,620,853 | Boese | Dec. 9, 1952 |
| 2,688,580 | Fingerhut | Sept. 7, 1954 |

FOREIGN PATENTS

| | | |
|---|---|---|
| 617,103 | Great Britain | Feb. 1, 1949 |